United States Patent [19]

Lakshmanan

[11] 4,018,732

[45] Apr. 19, 1977

[54] ADHESIVE COMPOSITION

[75] Inventor: Pallavoor R. Lakshmanan, Allison Park, Pa.

[73] Assignee: Gulf Research & Development Company, Pittsburgh, Pa.

[22] Filed: Jan. 2, 1976

[21] Appl. No.: 646,061

[52] U.S. Cl. .................... 260/27 R; 260/29.6 RB; 260/29.6 RW
[51] Int. Cl.$^2$ ........................................ C08L 93/00
[58] Field of Search ...... 260/29.6 RB, 27, 29.6 RW

[56] References Cited

UNITED STATES PATENTS

| | | | |
|---|---|---|---|
| 2,343,091 | 2/1944 | Smith | 260/27 R |
| 2,976,203 | 3/1961 | Young | 260/29.6 |

*Primary Examiner*—Melvyn I. Marquis
*Assistant Examiner*—William E. Parker

[57] ABSTRACT

An adhesive mastic composition consisting essentially of an acrylic-containing polymer latex, a water dispersion of a rosin ester and a filler or fillers.

6 Claims, No Drawings

ADHESIVE COMPOSITION

BACKGROUND OF THE INVENTION

1. Field of the Invention

This invention relates to an adhesive mastic composition consisting essentially of an acrylic-containing polymer latex, a water dispersion of a rosin ester and a filler or fillers having a long open time which also provides a tensile shear strength of at least about 250 pounds per square inch gauge (17.5 kilograms per square centimeter) in wood to wood bonding application.

2. Description of the Prior Art

In U.S. Pat. No. 2,976,203 to Young et al there is disclosed an adhesive composition containing a copolymer of a polyfunctional acid and the dimer of methacrylic acid, methyl methacrylate or acrylonitrile, and an ester of acrylic acid with an alcohol and, optionally, a filler and/or a thickening agent. In the commercial utilization of such adhesives it is desired to improve the open time thereof while maintaining extremely high tensile shear strength. By "open time"I mean the time interval between the application of the adhesive to one or both of two substrates and the mating of the two substrates to each other.

SUMMARY OF THE INVENTION

I have found that the addition of a water dispersion of a rosin ester to the composition defined above results in an improved adhesive composition having an open time of at least about ten minutes, preferably about 15 to about 30 minutes, which also provides a tensile shear strength of at least about 250 pounds per square inch gauge (17.5 kilograms per square centimeter), generally in the range of about 250 to about 500 pounds per square inch gauge (about 17.5 to about 35 kilograms per square centimeter) in wood to wood bonding application.

Those components common to the Young et al adhesive and to the adhesive defined and claimed herein are, with the exception of the molecular weight of the copolymer, substantially identical in composition. Thus, there is present herein an aqueous dispersion of a water-insoluble copolymer of about two to about four weight percent of a polyfunctional acid, such as itaconic acid, fumaric acid, and the dimer of methacrylic acid, about five to about 25 weight percent of methyl methacrylate or acrylonitrile, including mixtures thereof, and the remainder one or more esters of acrylic acid with an alcohol having from one to 18 carbon atoms, such as methyl acrylate, ethyl acrylate, butyl acrylate, cyclohexyl acrylate, 2-ethylhexyl acrylate, t-octyl acrylate, dodecyl acrylate, octadecyl acrylate, etc., and water insoluble salts thereof. The composition can have a pH of about 2.5 to about 7.0, or even higher, but, preferably, the pH is between about 4.0 and about 6.6. Proportions of the several components of the copolymers are such so as to provide a $T_1$ between $-15°$ and $+15°$ C. and, for optimum cohesive strength in conjunction with low-pressure bonding adhesion, the preferred $T_1$ is between $-5°$ and $+5°$ C. The $T_1$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_1$ value here used is the temperature at which the modulus of rigidity is 300 kilograms per square centimeter. An essential ingredient of the copolymer is that it be of a molecular weight in the range of about 50,000 to about 2,000,000, preferably about 80,000 to about 1,500,000.

The salt of the copolymer can be obtained by the use of ammonia, an alkali metal, such as sodium or potassium, or a water-soluble amine, such as a lower aliphatic amine of which triethylamine, diethylamine, and trimethylamine are representative morpholine, mono-ethanolamine, or triethanolamine. Preferably ammonia or a volatile amine is employed as the cation of the salt of the acid copolymer.

Methyl methacrylate, acrylonitrile or mixtures thereof is an essential ingredient of the composition. A minimum of about five weight percent of these monomers is essential to obtain sufficient rigidity in the adhesive to hold the adhesive coating in place in the final adhered structure. The upper limit of the component depends upon the content of the acid and the particular acrylate employed. At the lower limit of about two weight percent of acid, about 25 weight percent of this component can be employed, but as the acid content is increased to about four weight percent the maximum content of this component that is permissible gradually decreases until a value of about five weight percent thereof is reached when the acid content reaches about four weight percent. When the third or acrylic acid ester component is ethyl acrylate or methyl acrylate or mixtures thereof, the amount of methyl methacrylate or acrylonitrile should not exceed about 15 weight percent whereas with the higher alcohol acrylates, such as butyl acrylate, the amount of methyl methacrylate or acrylonitrile can be as high as about 25 weight percent The acid component is needed to provide specific adhesion to a wide variety of substrates and especially to those of hydrophylic or metallic character.

As noted, particular ester of acrylic acid that is employed can be chosen from a wide group of esters that includes methyl acrylate, ethyl acrylate, butyl acrylate, cyclohexyl acrylate, 2-ethylhexyl acrylate, t-octyl acrylate, dodecyl acrylate, octadecyl acrylate, etc. Preferably, the copolymers are made from methyl acrylate, ethyl acrylate or butyl acrylate, because of the availability and inexpensiveness of these monomers.

The aqueous dispersion containing the copolymer defined above can contain about 30 to about 60 weight percent water and at least about 30 weight percent of the copolymer or the salt thereof. Preferably, however, the composition comprises about 50 to about 60 weight percent and about 40 to about 50 weight percent of the copolymer or the salt thereof.

These dispersions can be prepared, for example, by following the procedure of the Young et al patent referred to above.

The second necessary component of the adhesive composition defined and claimed herein is a rosin ester. Rosins and their esters are old and well known and are described, for example, on pages 139 to 141 and 141 to 143, respectively, of the Encyclopedia of Polymer Science and Technology, Volume 12, Interscience Publishers, Division of John Wiley and Sons, Inc., 1970. In particular, the rosin esters used herein are those wherein the carboxyl group on the resin component of the rosin has been esterified with a polyfunctional alcohol having from two to four carbon atoms, such as glycol, glycerol, pentaerythritol, etc. Those defined on page 143 of said encyclopedia are particularly useful herein.

Rosin ester dispersion is obtained, for example, by dispersing a prepared solution of rosin ester in some suitable solvent, in water, containing a surfactant, under high speed agitation. The solvent employed for the rosin ester solution can be selected amongst such solvents as toluene, xylene, ethyl acetate, methyl ethyl ketone, mineral spirits, glycol ethers, such as ethylene glycol mono ethyl ether acetate, and chlorinated solvents, such as trichloroethylene. However, butyl acetate is a preferred solvent. Similarly, the surfactant used for obtaining a dispersion can be other than sodium oleate, e.g., a non-ionic surfactant, such as alkylaryl polyether alcohols, or anionic surfactants, such as sodium alkylaryl polyether sulfonate.

Examples of rosin and its esters that can be employed are glycerol esters of rosin, pentaerythritol esters of rosin and the corresponding rosin or its esters obtained from dehydrogenated, disproportionated, polymerized and hydrogenated rosins. Modified rosins, such as maleic-modified rosin and rosin derivitives can also be employed.

The third necessary component herein is a filler, the purpose of which is to increase the tensile strength of the adhesive and to reduce the cold flow or creep thereof. Examples of fillers that can be used herein include $CaCO_3$, clay, silicates, ZnO, etc. In general, the fillers will be of a particle size that will range from about 0.05 to about 75 microns, preferably in the range of about 0.5 to about 10 microns.

Optionally, other materials normally added to adhesives of the type defined and claimed herein for a particular purpose can also be included in the final composition. For example, the composition can contain from about 0.5 to about 20 weight percent of each of a thixotropic or thickening agent, such as asbestos, treated clays, fumed silicas, etc.; a surfactant, wetting agent or emulsifier, such as Triton X-405 (Rohm and Haas, Philadelphia, Pa.), which is an octyl phenoxy polyethoxy ethanol; a dispersant, such as Tamol 850 (Rohm and Haas, Philadelphia, Pa.), which is an aqueous solution of sodium polyacrylate; etc.

The composition can be prepared in any suitable or convenient manner. For example, the individual components are brought together in any suitable or desired order and merely mixed, for example, for about ½ to about 3 hours, until each of the components of the mixture are substantially uniformly spatially dispersed in the final adhesive composition.

The adhesive composition herein can be used with a large variety of substrates, for example, wood, concrete, gypsum board, styrofoam, etc. Any of these substrates can generally be bonded to itself or to a different substrate using the novel adhesive compositions herein.

The components of the adhesive composition can be present in the following amounts:

| | Parts by weight | |
|---|---|---|
| | Broad Range | Preferred Range |
| Acrylic-Containing Polymer Dispersion (57 Per Cent Solids) | 100 | 100 |
| Rosin Ester Dispersion (40 Per Cent Solids) | 20–150 | 25–75 |
| Filler | 25–400 | 50–150 |

DESCRIPTION OF PREFERRED EMBODIMENTS

The process can further be illustrated by the following.

Preparation of Rosin Ester Dispersion

A solution of rosin ester (Zonester 85, Arizona Chemicals Co., Wayne, N.J.) which is a glycerol ester of tall oil rosin having a Ring & Ball Softening point of 83° C., was first prepared by dissolving 180 grams of the rosin ester in 120 grams of butyl acetate under constant stirring. The rosin ester solution was then gradually introduced to 150 grams of water containing two grams of 25 percent NaOH and 3.0 grams of oleic acid under high speed agitation. The addition of rosin ester solution to water was carried out over a 10–20 minute period. Following the completion of addition of the rosin ester solution, the agitation was continued for a further 30-minute period. A dispersion of rosin ester of about 40 percent solids and a viscosity in the 80–500 cps range at 23° C. was obtained.

Preparation of Adhesive Mastic

To an acrylic emulsion (Rhoplex N-495) there was added the above dispersion of a glycerol ester of tall oil rosin (Zonester 85) in a 600 ml. capacity sigma blade mixing head attached to a Brabender plasticorder and the mixture was mixed under slow speed for 15 minutes. There was then added a mixture containing a non-ionic surfactant (Triton X-405), a low foam dispersant (Tamol 850), a primary pigment dispersant (Composition T) and water, followed by a two percent solution of a thixotropic agent (Bentone LT), $CaCO_3$, clay and asbestos fiber. Mixing was continued for 30 minutes at 60 r.p.m. until a smooth homogeneous mastic was obtained. The mastic was then loaded into an eleven-ounce paper caulking cartridge lined with aluminum foil having a polyethylene spout. The mastic-loaded cartridge was sealed with a polyethylene stopper and stored. A similar composition was also prepared but with no resin ester present. The two adhesive mastic compositions were tested for their tensile lap shear and for their open time characteristics.

For the tensile lap shear test, several 1 inch × 4 inch × ¼ inch (2.5 cm. × 20 cm. × 0.6 cm.) three-ply fir plywood coupons were tapped together to form a panel of five. The adhesive was then applied from a caulking gun as two ⅛ inch (0.3 cm.) diameter beads within a one square inch (6.25 square cm.) area from the edge of the individual coupon. Another similar set of five coupons was then positioned over the first set to form a one square inch lap joint between the two coupons and pressed evenly to distribute the adhesive under a light load. The adhesive line thickness thus obtained waas between 20 and 25 mils (0.05 to 0.06 cm.). The assembly was then maintained at 73° F. (23° C.) and 50 percent relative humidity for selected periods of time. The aged specimens were then tested for their tensile lap shear strength using an Instron Tensile Testor at a jaw speed of 0.5 inch, or 1.25 cm. per minute. The maximum strength of the lap joint at break was recorded and the average of five was reported.

For the test demonstrating the effect lapsed time, or open time (after application of the adhesive) on the rate of the bond strength development, samples were prepared as outlined above, except that in certain instances the second set of samples positioned on the surface carrying the adhesive was removed and left exposed for various periods of time, namely, 10, 20, and 30 minutes, after which they were reassembled and then aged for seven days at 73° F. (23° C.) at 50 percent relative humidity, after which they were tested in the manner described above.

The results obtained are tabulated below in Table I.

TABLE I

| Composition | Grams | |
|---|---|---|
| | Control | Claimed Adhesive |
| Rhoplex N-495 (57 Per Cent) | 100 | 100 |
| Zonester 85 Dispersion (40 Per Cent) | None | 42 |
| CaCO₃ | 90 | 90 |
| Clay | 10 | 10 |
| Asbestos Fiber | 3 | 3 |
| Bentone LT (2 Per Cent Solution) | 47 | 47 |
| Triton X-405 | 2.2 | 2.2 |
| Tamol 850 | 0.3 | 0.3 |
| Composition T | 2.5 | 2.5 |
| Water | 20.0 | 5.0 |

| Time, Minutes | Tensile Shear Strength, psig (kg/cm²) | |
|---|---|---|
| 0 | 228(16) | 431(30.3) |
| 10 | 207(14.55) | 289(20.3) |
| 20 | 165(11.6) | 288(20.2) |
| 30 | 112(7.87) | 271(19.0) |

In the above table, Rhoplex N-495 is an acrylic emulsion of about 57 percent solids having a viscosity of about 2000 cps. at 25° C., made by Rohm and Haas, Philadelphia, Pa.; Zonester 85 is a glycerol ester of tall oil rosin made by Arizona Chemicals Company, Wayne, N.J.; Bentone LT is a form of treated clay made and sold by NL Industries, Inc., Hightstown, N.J. and serves as a thixotropic agent; Triton X-405 is an octyl phenoxy polyethoxy ethanol wetting agent and emulsifier made by Rohm and Haas; Tamol 850 is a low-foam dispersant aqueous solution of sodium polyacrylate made by Rohm and Haas; and Composition T is an anionic zinc-sodium polymetaphosphate primary pigment dispersant made by Merck and Co., Rahway, N.J.

The superiority of the adhesive defined and claimed herein is apparent from the data in Table I. Note that when the control adhesive was employed in the tests and the substrates were bonded together with no open time the tensile shear strength was 228 pounds per square inch gauge, below the minimum desired tensile shear strength of 250 pounds per square inch gauge, and was reduced to 112 pounds per square inch gauge after 30 minutes open time. This is in contrast with the claimed composition wherein the initial tensile shear strength was 431 pounds per square inch gauge and even after an open time of 30 minutes the tensile shear strength had stabilized at 271 pounds per square inch gauge, well within the minimum desired tensile shear strength of 250 pounds per square inch gauge.

Obviously, many modifications and variations of the invention, as hereinabove set forth can be made without departing from the spirit and scope thereof, and therefore only such limitations should be imposed as are indicated in the appended claims.

I claim:

1. An improved adhesive composition consisting essentially of (1) an aqueous dispersion of a polymeric substance selected from the group consisting of a water-insoluble linear copolymer, and salts thereof, of about two to about four weight percent of an acid selected from the group consisting of itaconic acid, fumaric acid, and the dimer of methacrylic acid, about five to about 25 weight percent of a member selected from the group consisting of methyl methacrylate and acrylonitrile, and the balance of at least one ester of acrylic acid with an alcohol having from one to 18 carbon atoms, the copolymer having a $T_1$ between about −15° C. and +15° C. and a viscosity average molecular weight between about 50,000 to about 2,000,000, the salt being selected from the group consisting of those of ammonium, alkali metals and those formed with a water-soluble amine, the dispersion containing about 30 to about 55 weight percent of water and at least about 30 weight percent by weight of copolymer, (2) a rosin ester dispersion, and (3) a filler or fillers, said components being present in the following amounts:

| | Parts By Weight |
|---|---|
| Acrylic-Containing Polymer Dispersion | 100 |
| Rosin Ester Dispersion | 20–150 |
| Filler | 25–400 |

2. The composition of claim 1 wherein the components of the composition are within the following ranges.

| | Parts By Weight |
|---|---|
| Acrylic-Containing Polymer Dispersion | 100 |
| Rosin Ester Dispersion | 25–75 |
| Filler | 50–150 |

3. The composition of claim 1 wherein the molecular weight of the copolymer is within the range of about 80,000 to about 1,500,000.

4. The composition of claim 1 wherein the rosin ester is a dispersion based on an ester of rosin with polyfunctional alcohol having from two to four carbon atoms.

5. The composition of claim 1 wherein the filler is calcium carbonate.

6. The composition of claim 1 wherein the filler is clay.

* * * * *